N. WEILER.
GANG PLOW.
APPLICATION FILED DEC. 12, 1910.
1,014,987.
Patented Jan. 16, 1912.
2 SHEETS—SHEET 1.
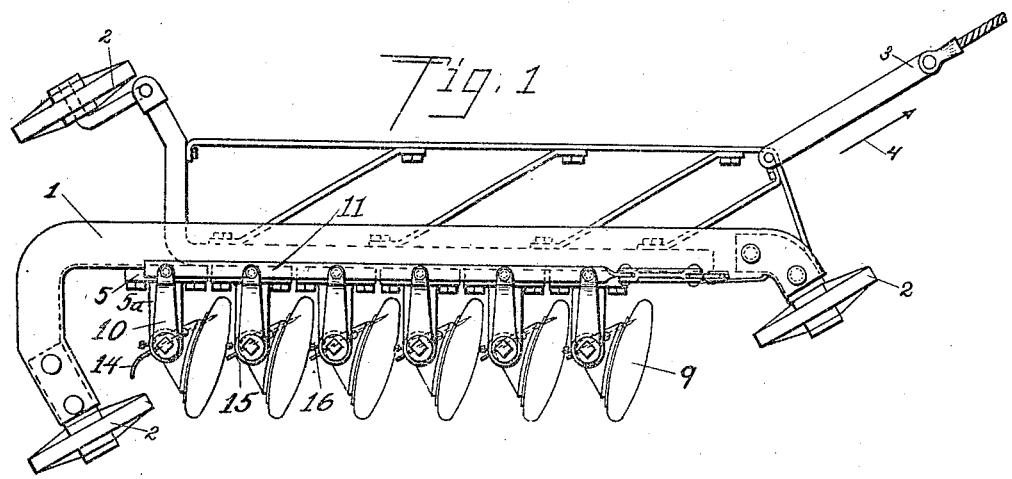
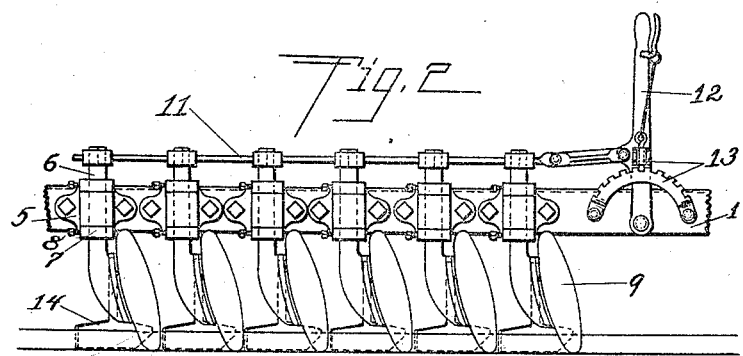
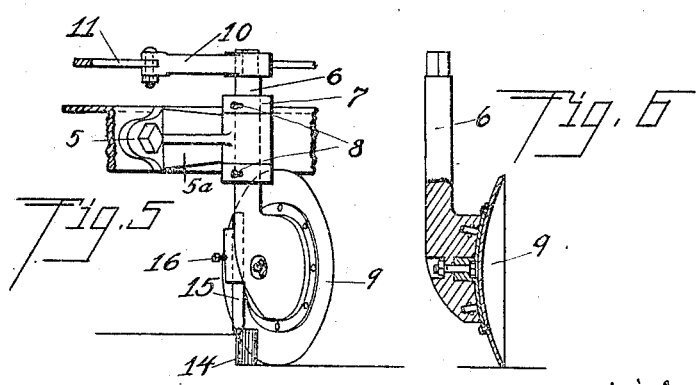
Witnesses
Roy G. Kratz
J. E. Titus
Inventor
Nicholas Weiler,
By Millard Eddy, Attorney

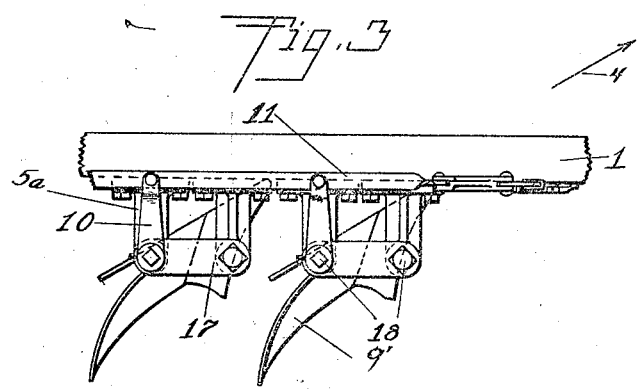
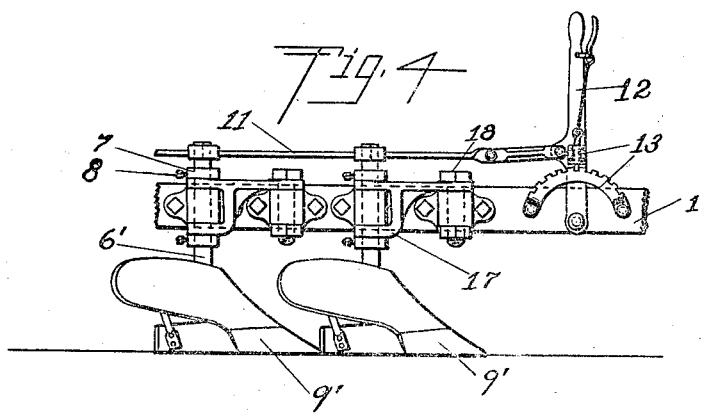

UNITED STATES PATENT OFFICE.

NICHOLAS WEILER, OF FORT COLLINS, COLORADO, ASSIGNOR OF ONE-HALF TO B. L. SHRADER, OF FORT COLLINS, COLORADO.

GANG-PLOW.

1,014,987.   Specification of Letters Patent.   Patented Jan. 16, 1912.

Application filed December 12, 1910. Serial No. 596,966.

*To all whom it may concern:*

Be it known that I, NICHOLAS WEILER, of Fort Collins, in Larimer county, in the State of Colorado, have invented certain new and useful Improvements in Gang-Plows, which improvements are described in the following specification and are illustrated by the accompanying drawings.

This invention relates in general to gang plows of all kinds, including both those in which the furrowing members are moldboards and also those in which the furrowing members are disks; and relates in particular to the attachment and control of the furrowing members. These members, being parts which turn the soil by immediate contact therewith, will for convenience be hereinafter designated and claimed collectively, alternatively and indiscriminately by the term furrowers.

The objects of this invention are to change the direction of the furrowers of a gang plow, relatively to the gang frame and to the line of draft, for the purpose of cutting wider or narrower furrows, as may be desired; to accomplish this change of direction, without stopping the draft animals or engine, and while the plow is plowing; to lock the furrowers in position at every change of direction; to render applicable to a disk plow the same direction-changing mechanism which is applied to a moldboard plow; for this purpose to provide the disks of a gang plow with steering cutters, serving as landsides; to render disks and moldboards applicable to a single plow gang simultaneously, successively and interchangeably; to connect the furrower to the gang frame by co-acting parts which permit both a lateral turning movement and a vertical translation of the furrower. To accomplish these objects I attach each furrower to the gang frame by intermediate brackets, which are pivoted together by a rockshaft, actuated by a hand lever.

The best manner in which I have contemplated applying the principles of the invention, is shown in said drawings.

Figure 1 is a plan of a portion of a disk plow which is constructed in accordance with these principles. Fig. 2 is a side elevation of a portion of Fig. 1. Figs. 3 and 4 are similar views respectively of parts of a moldboard gang plow, which is constructed in accordance with the same principles. Figs. 5 and 6 are enlarged details.

In these drawings the same reference numerals, which are applied to parts of Figs. 1 and 2, are also applied, together with exponential primes, to the corresponding parts of Figs. 3 and 4.

In Fig. 1 the numeral 1 denotes the main beam of a gang frame, which is mounted on wheels 2 in any ordinary or convenient manner. To this frame is pivoted a drawbar 3 which is drawn in the direction of the arrow 4, when straight furrows are being plowed. To the side of beam 1 are bolted at suitable intervals a number of brackets 5, having each a horizontal arm 5$^a$ and a vertical sleeve hole through the free end of that arm. The sleeve of bracket 5 constitutes a bearing for a rockbar 6, which is vertically adjustable therein, being held in any desired position of adjustment by collars 7, which are fastened to said rockbar by set-screws 8. The lower end of rockbar 6 is of any desired or convenient conformation to engage and carry the furrower 9; and the furrowers are attached to the rockbars in any ordinary or convenient manner. Each rockbar 6 carries at the top a removable rock arm 10, which is pivoted to a reciprocable bar 11; and this bar is linked to an adjustable hand lever 12, which has an automatic catch 13. In disk plows I attach to the foot of rockbar 6 a vertical plate 14 by means of a vertical stem 15 of that plate, which stem is fastened by a set-screw 16 and is adjustable both vertically and rotarily in a sleeve, formed for its accommodation in the foot of that rockbar. In assembling the plow with moldboards, I insert the rockbars 6 in only the alternate bracket arms 5$^a$, and connect the same by eye-braces 17 with bolts 18, which are inserted in the other of those arms.

Such being the construction of my improvements in gang plows, the operation of the same accomplishes the several above mentioned objects of the invention. For the purpose of cutting wide or narrow furrows as may be desired, the direction of the furrowers relatively to the gang frame and to the line of draft, is changed by manipulation of the hand lever 12, which acts through bars 11, arms 10 and rockbars 6—a change which is readily made while the machine is in motion; the furrowers are locked in any desired position automatically by the hand lever 12 and catch 13. The described vertical rockbars and co-acting mechanism are applied to change the direction of disks and moldboards alike. The disks and moldboards are rendered applicable to a single gang frame interchangeably by the identical form of the vertical rockbar of both those furrowers; from this it results that disks with their attached rockbars may be removed from the plow, and moldboards with their attached rockbars may be substituted therefor at pleasure, and conversely disks may be substituted for moldboards in like manner, so that by such substitution a single gang plow, supplied with furrowers of both kinds, is made to serve the purposes of two gang plows of different kinds.

Such being the construction and operation of my improvements in gang plows, I claim as my invention:—

A gang plow, comprising a plurality of revolving disks carried by vertical rockshafts having internal bearings in combination with a plurality of vertical plates having stems adjustable both vertically and rotarily in said internal bearings.

In testimony whereof, I hereunto subscribe my name in the presence of two witnesses.

NICHOLAS WEILER.

Witnesses:
 WILLARD EDDY,
 CHARLES BELLAS.